US007612653B2

(12) United States Patent
Miller et al.

(10) Patent No.: US 7,612,653 B2
(45) Date of Patent: Nov. 3, 2009

(54) WALL-MOUNTED NETWORK OUTLET

(75) Inventors: Richard D. Miller, Lancaster, PA (US);
Steven Charles Mongold,
Hummelstown, PA (US); **Keith James
McKechnie**, Harrisburg, PA (US)

(73) Assignee: Tyco Electronics Corporation,
Middletown, PA (US)

( * ) Notice: Subject to any disclaimer, the term of this patent is extended or adjusted under 35 U.S.C. 154(b) by 185 days.

(21) Appl. No.: 11/461,648

(22) Filed: Aug. 1, 2006

(65) Prior Publication Data

US 2008/0030971 A1 Feb. 7, 2008

(51) Int. Cl.
G08B 9/00 (2006.01)
G09F 25/00 (2006.01)
H01H 9/02 (2006.01)
H02G 3/14 (2006.01)

(52) U.S. Cl. .......................... 340/286.02; 340/286.01; 174/58; 174/53; 174/54; 174/55; 220/241

(58) Field of Classification Search ............ 340/286.02; 174/58
See application file for complete search history.

(56) References Cited

U.S. PATENT DOCUMENTS

| 5,599,206 | A | * | 2/1997 | Slack et al. ................. 439/536 |
| 5,721,394 | A | * | 2/1998 | Mulks ......................... 174/502 |
| 5,994,998 | A | | 11/1999 | Fischer et al. ........... 340/310.01 |
| 6,140,911 | A | | 10/2000 | Fisher et al. ............ 340/310.01 |
| 6,212,195 | B1 | | 4/2001 | McCormack et al. ....... 370/419 |
| 6,329,906 | B1 | | 12/2001 | Fisher et al. ............ 340/310.01 |
| 6,420,964 | B1 | * | 7/2002 | Nishikawa et al. .......... 375/257 |
| 6,445,087 | B1 | | 9/2002 | Wang et al. |
| 6,449,348 | B1 | | 9/2002 | Lamb et al. .............. 379/93.36 |
| 6,496,105 | B2 | | 12/2002 | Fisher et al. ........... 340/310.01 |
| 6,535,983 | B1 | | 3/2003 | McCormack et al. ....... 713/310 |
| 6,587,454 | B1 | | 7/2003 | Lamb |
| 6,750,398 | B1 | * | 6/2004 | Richardson .................. 174/58 |
| 6,855,881 | B2 | | 2/2005 | Khoshnood |
| 6,856,043 | B2 | * | 2/2005 | DeLeeuw .................... 307/9.1 |
| 6,880,020 | B1 | | 4/2005 | Rubinstein et al. .......... 709/250 |
| 6,943,295 | B2 | * | 9/2005 | Herth .......................... 174/58 |
| 6,981,892 | B1 | | 1/2006 | Kostelnik |
| 7,003,102 | B2 | | 2/2006 | Kiko |

(Continued)

OTHER PUBLICATIONS

3COM: 3Com™IntelliJack™ Switch NJ240FX [online], [retrieved on Jun. 20, 2006]. Retrieved from the internet <URL www.3com.com>.

*Primary Examiner*—Daniel Wu
*Assistant Examiner*—Jack Wang

(57) ABSTRACT

A network outlet fixture providing wall-mounted LAN jacks. The fixture may include an in-wall power supply and be configured for mounting within a conventional multi-gang wall box. The power supply may be directly connected to an adjacent wall outlet, which serves as a power source, in the same or an adjacent wall box. The fixture may include both network switching and fiber-to-copper media converter functionality. The fixture may be configured to disconnect the power source upon removal of a face plate of the fixture. Further, the fixture may be configured to allow mounting of the jack-supporting structure in any one of several different positions relative to a remainder of the outlet fixture. This allows for presentation of the LAN jacks in a certain preferred orientation while permitting the remainder of the outlet fixture to be mounted in several different orientations relative to a wall.

19 Claims, 6 Drawing Sheets

U.S. PATENT DOCUMENTS

| | | |
|---|---|---|
| 7,136,936 B2 * | 11/2006 | Chan et al. .................. 709/250 |
| 2003/0112965 A1 | 6/2003 | McNamara et al. .... 379/399.01 |
| 2004/0121648 A1 * | 6/2004 | Voros ......................... 439/535 |
| 2005/0010954 A1 | 1/2005 | Binder ........................ 725/78 |
| 2005/0047431 A1 * | 3/2005 | Binder ........................ 370/463 |
| 2005/0136989 A1 | 6/2005 | Dove .......................... 455/572 |
| 2006/0119182 A1 * | 6/2006 | Menas et al. .................. 307/38 |
| 2006/0190739 A1 * | 8/2006 | Soffer ........................ 713/189 |
| 2006/0276144 A1 * | 12/2006 | Campbell .................. 455/90.3 |
| 2007/0032106 A1 * | 2/2007 | Lichtscheidl et al. ........ 439/131 |
| 2007/0197262 A1 * | 8/2007 | Smith et al. .............. 455/562.1 |
| 2008/0196936 A1 * | 8/2008 | Yamamoto et al. .......... 174/520 |

\* cited by examiner

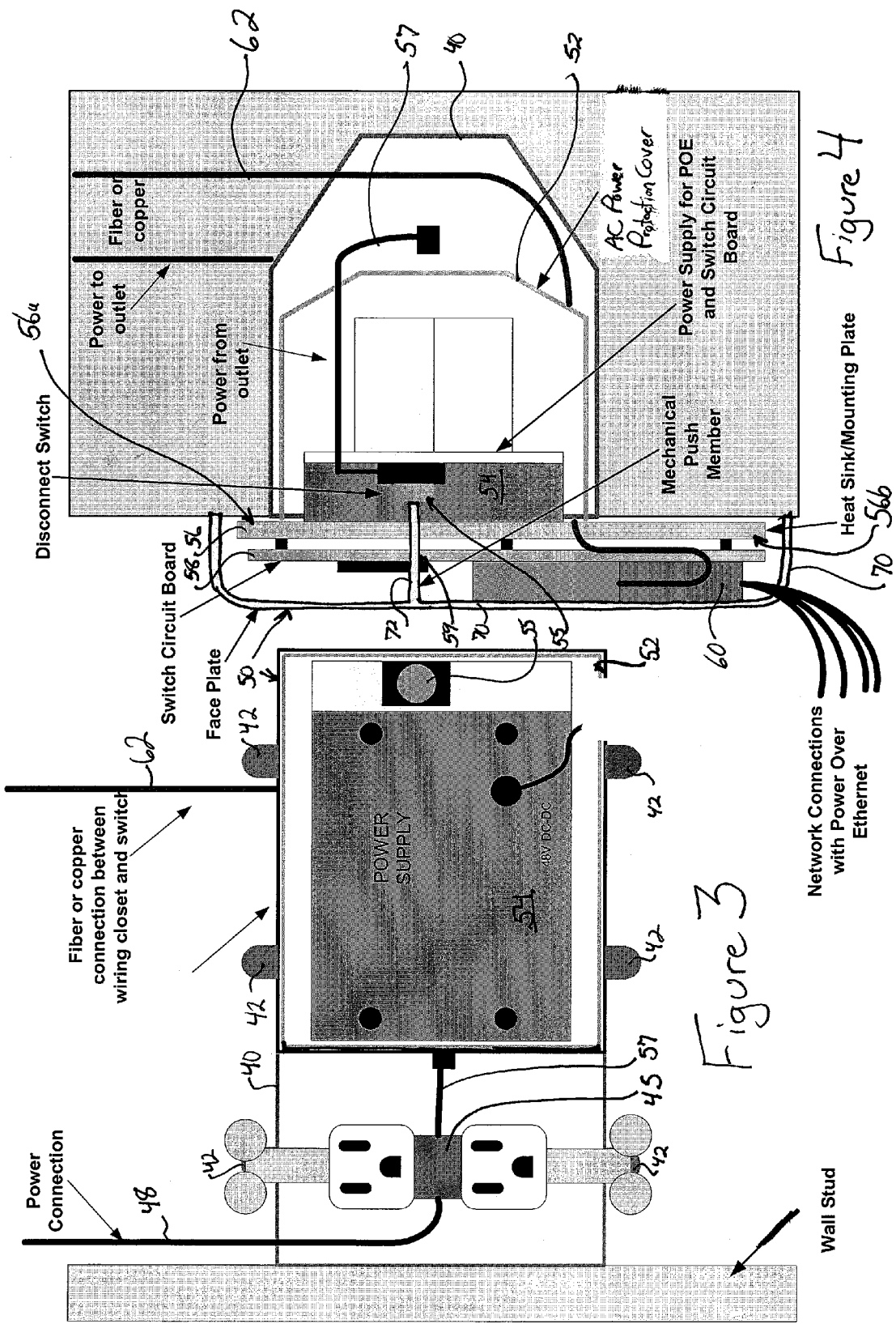

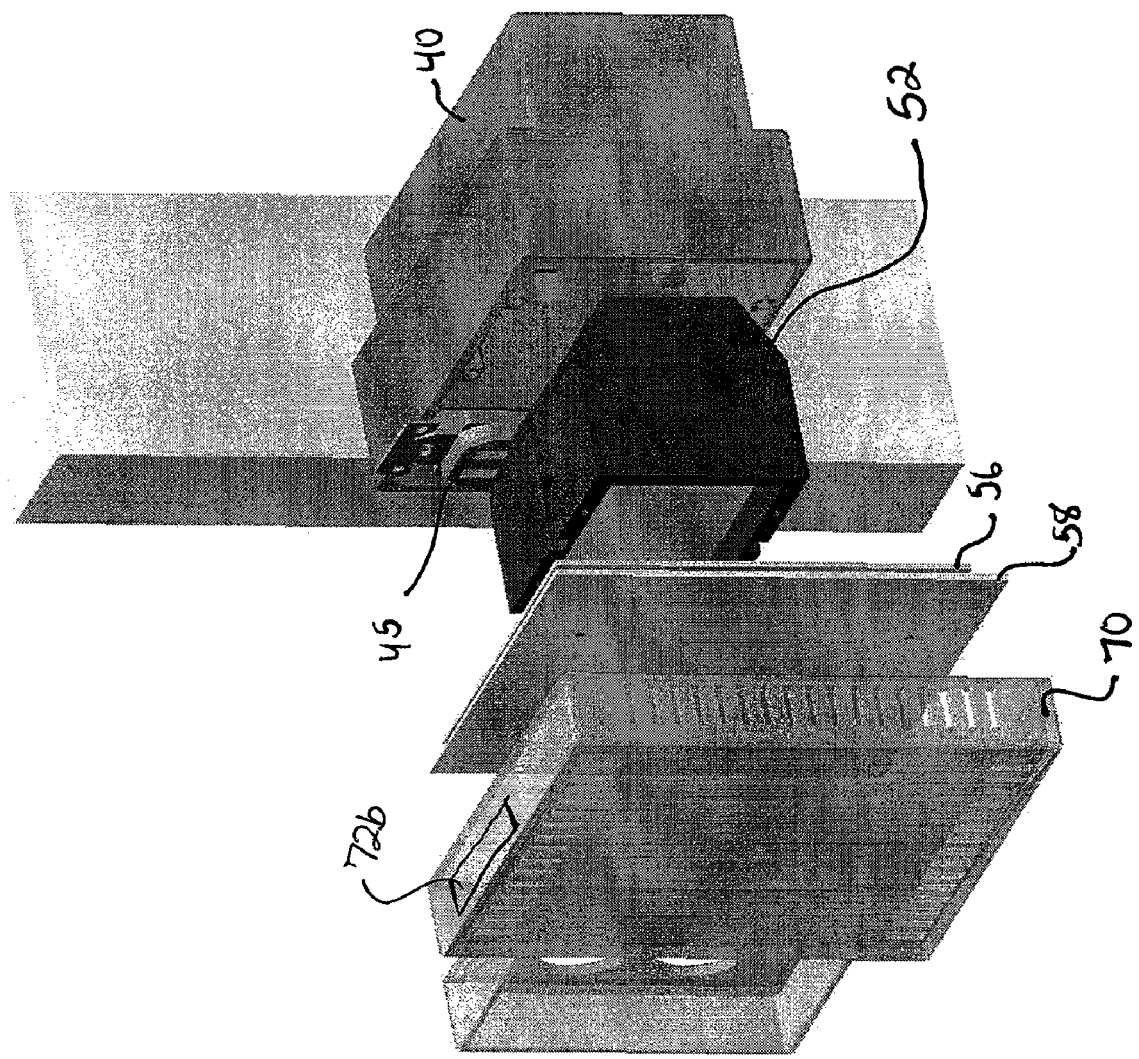

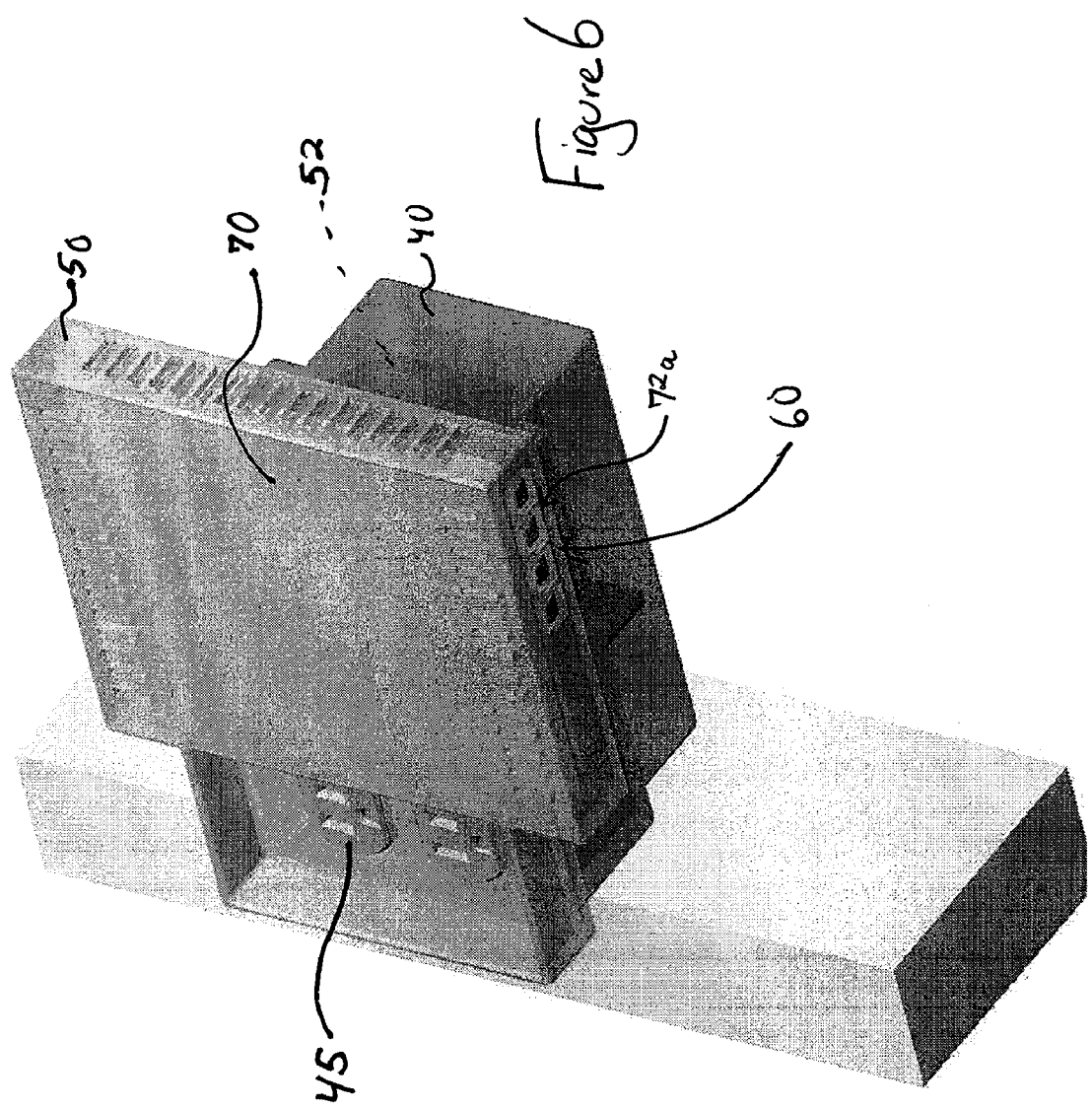

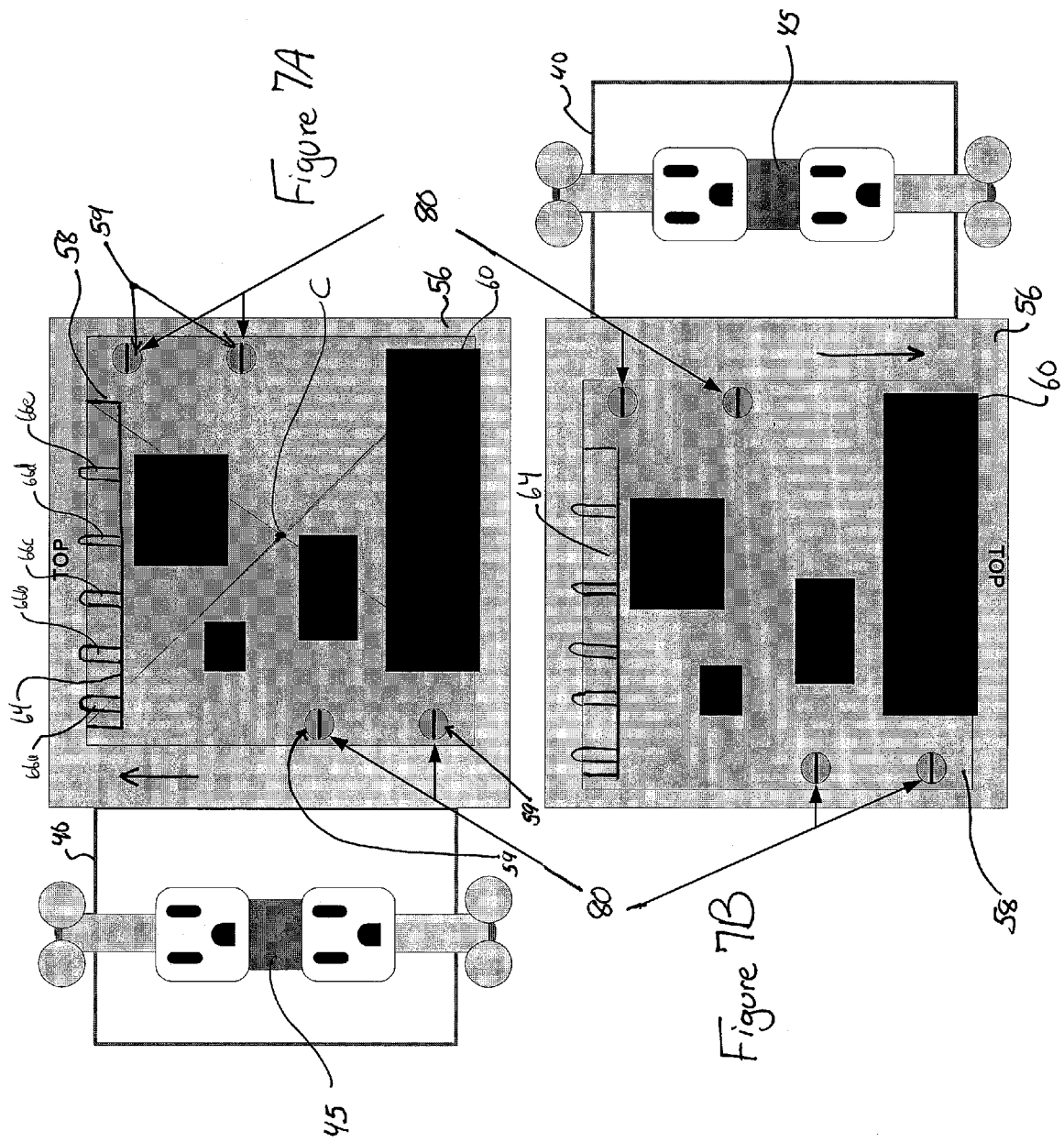

WALL-MOUNTED NETWORK OUTLET

FIELD OF THE INVENTION

The present invention relates generally to networking and communications technology, and more specifically to a network outlet providing fiber-to-copper media converter and/or network switch functionality.

DISCUSSION OF RELATED ART

FIG. 1 provides a simple example of a conventional user station 10 and network hardware, showing for illustrative purposes connection to a remote server, etc. As shown in FIG. 1, typical Local Area Networking (LAN) cabling presently involves providing one or more LAN jacks for each user station, e.g. in an office, cubicle, room, etc. 14. Each user station may include, for example, a network-connected desktop or laptop computer 16 and a network-connected printer 18, each of which is connected to a respective LAN jack for communication with remotely located network servers, network switches, etc. Further, each user station may include a telephone 20, a video display monitor 22 and other powered equipment, each of which requires connection to a conventional electrical outlet 24 in addition to the user station's computer and printer. The number of required electrical outlets typically exceeds the number of in-wall electrical outlets, typically resulting in the use of multi-outlet power strips 26, and the like.

With the growing use of Voice Over Internet Protocol (VoIP) telephones instead of conventional telephones, there is an increased demand for electrical outlets and LAN jacks, as such VoIP telephones often require a powered Ethernet switch 28 with a Power over Ethernet (PoE) jack 30. PoE technology and standards continue to evolve, but are described in IEEE Drafts P802.3af/D3.0 or later, which is incorporated herein by reference. Additional devices may also require such PoE connections.

In optical fiber-to-the-wall applications in which the in-wall jack is an optical jack 12 instead of a conventional network jack, an electrically powered fiber-to-copper media converter 32 is required at each user station to convert optical signals to electrical signals.

Accordingly, user stations are becoming increasingly cluttered and complex with increased needs for electrical power outlets and network devices between the wall jack and the user station devices. The presence of such devices, and related cabling, presents increased risk of theft of equipment, increased clutter, and increased opportunity for human error in connection or accidentally disconnecting cabling.

SUMMARY OF THE INVENTION

An embodiment of the present invention provides a network outlet fixture providing a plurality of wall-mounted LAN jacks, such as PoE jacks. The outlet fixture may include an in-wall power supply and be configured to be mountable within a conventional in-wall, multi-gang wall box. The power supply is preferably configured for direct electrical connection of the power supply to an in-wall portion of an adjacent wall outlet in the same or an adjacent wall box. For example, the power supply may include a plurality of insulated wire leads for this purpose.

The fixture preferably provides fiber-to-copper media converter and network switch functionality. Certain preferred embodiments of the fixture include structures that allow for disconnection from the power source upon removal of the fixture's face plate. Optionally, the fixture further includes structures allowing for mounting of the jack-supporting structure in any selected one of a plurality of different rotational orientations relative to a remainder of the outlet fixture to allow for presentation of the jacks in a single preferred orientation relative to a wall while permitting the remainder of the outlet fixture to be mounted in any of a plurality of different orientations relative to the wall.

BRIEF DESCRIPTION OF THE DRAWINGS

The present invention will now be described by way of example with reference to the following drawings in which:

FIG. 3 is front view of an exemplary network outlet fixture shown mounted in a conventional multi-gang wall box, but with a circuit board and face plate shown removed for illustrative clarity;

FIG. 4 is a side view of the exemplary network outlet fixture of FIG. 3, shown with the circuit board and face plate;

FIG. 5 is an exploded view of the network outlet fixture of FIG. 4;

FIG. 6 is a perspective view of the network outlet fixture of FIG. 4; and

FIGS. 7A and 7B are front views of an exemplary mounting plate shown mounted in upright and inverted positions, and an exemplary circuit board shown mounted upright with both mounting plate orientations.

DETAILED DESCRIPTION

Figure 1:
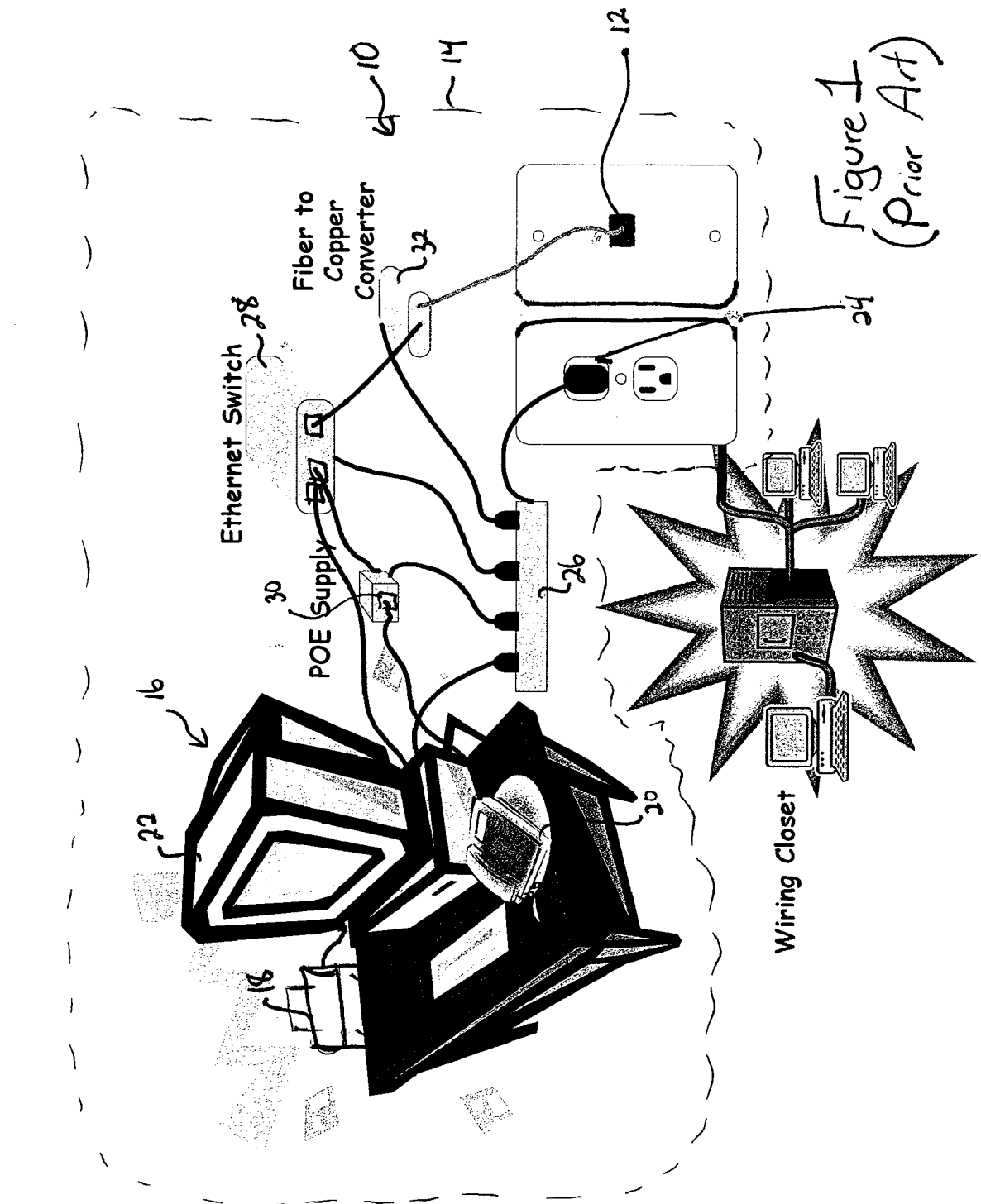
FIG. 1 is a diagram of an exemplary prior art user station.
Figure 2:
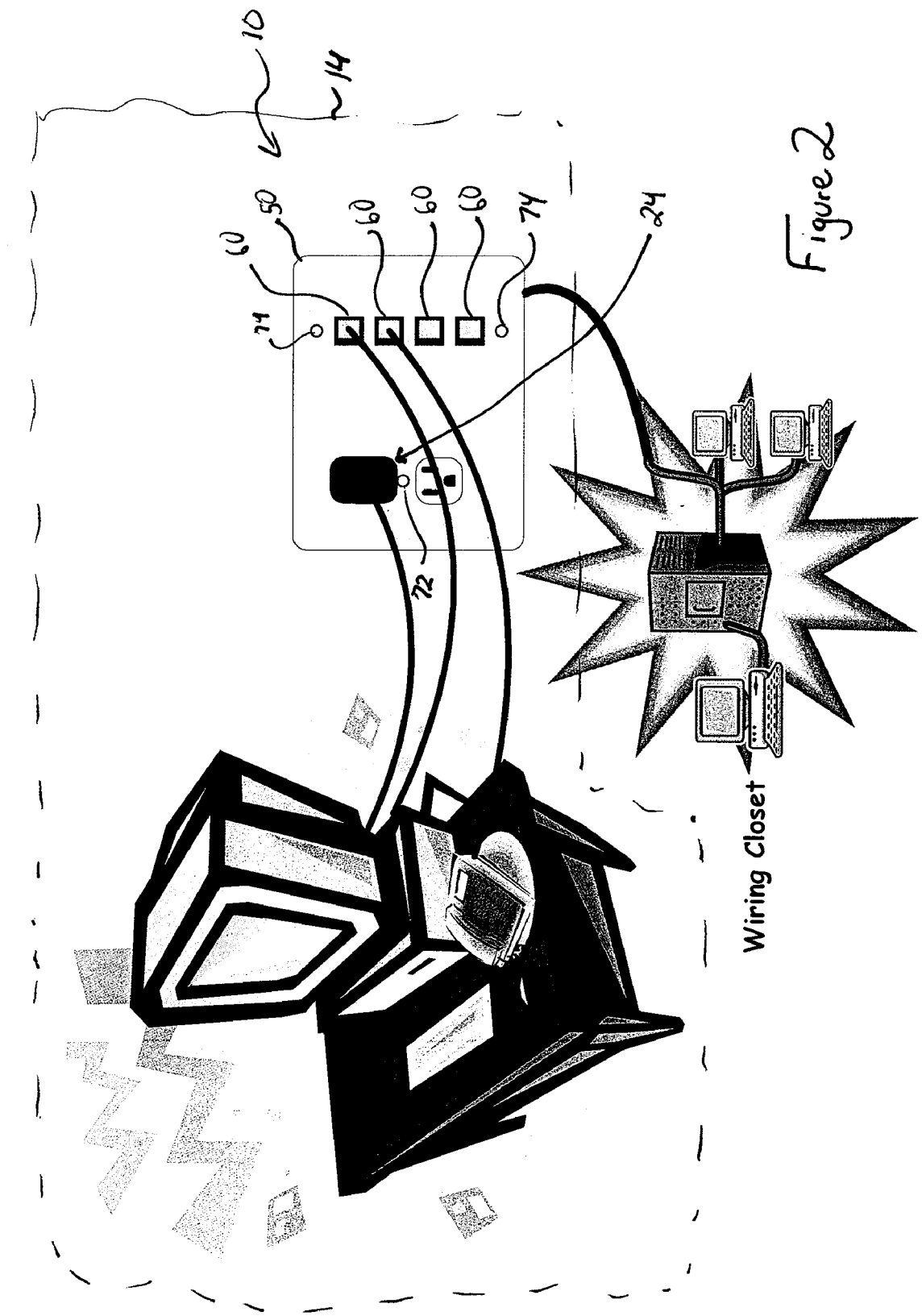
FIG. 2 is a diagram of an exemplary user station including an exemplary wall-mounted network outlet fixture in accordance with the present invention.

The present invention provides a network outlet fixture providing a plurality of wall-mounted LAN/network jacks, such as RJ45 jacks providing Ethernet and/or Power over Ethernet network connections. An exemplary embodiment of the network outlet fixture includes an in-wall power supply and is configured to be mountable within a conventional in-wall, multi-gang wall box of a type generally used for residential and commercial wiring for receptacles, light switches, and the like. As shown in FIG. 2, the network outlet fixture 50 incorporates and mounts in and/or on the wall a number of functional components previously provided between a wall-mounted network jack and end user equipment at a user station. Accordingly, user station clutter is reduced, in-wall electrical power outlets are more readily available, and the need for a power strip may be eliminated.

FIGS. 3 and 4 show front and side views of an exemplary network outlet fixture 50 mounted in a conventional three-gang wall box 40, such as a metallic or plastic multi-gang wall box. The wall box 40 is mounted to a stud, etc. within the wall in a manner well known in the art.

In this exemplary embodiment, a standard, grounded 120VAC duplex electrical power receptacle 45 is mounted to the wall box 40 and wired to a 120VAC power source via cable 48, in a manner well known in the art. The electrical connection to the receptacle 45 is made via "back stab" terminals, screw terminals or other in-wall connections, as well known in the art. Accordingly, the receptacle 45 is mounted and wired in a conventional fashion.

In accordance with the present invention, a network outlet fixture 50 is also mounted within a conventional multi-gang wall box, in this example, the same three-gang wall box 40, as shown in FIGS. 3 and 4. In the example of FIGS. 3-6, the network outlet fixture 50 includes a housing 52 configured for mounting within the multi-gang wall box 40, e.g. by fixing with screws to the mounting ears 42 of the wall box 40, or by fixing with screws, snap fasteners, etc. to a mounting plate 56, as discussed below. The housing 52 is dimensioned to fit within, e.g. nest with, the wall box 40. The housing 52 acts as a protective cover enclosing and electrically isolates components of the network outlet fixture 50 from the wall box 40 and other devices within the wall box 40, and from human contact, reducing the possibility of electrical shorts or electrical shock.

The exemplary network outlet fixture 50 includes an in-wall power supply 54, such as a conventional AC/DC commercially available power supply. The power supply contains an isolated AC to DC power converter to provide power for the PoE circuit components. It may also contain a second AC to DC or DC to DC power converter to provide power for the network switch components and/or the fiber to copper media converter components. The power supply is supported on a mounting plate 56, e.g. on a rear surface 56a thereof, preferably by direct connection to the mounting plate, and alternatively by direct connection to the housing 52 mounted to the mounting plate 56.

In a preferred embodiment, the power supply 54 is configured for direct electrical connection to an in-wall portion of an adjacent receptacle 45 in the same or an adjacent wall box. For example, the power supply 54 may include insulated wire leads 57 attachable to the "back stab" or screw terminals of the adjacent receptacle 45. A portion of the insulation may be removed at the distal end of each of the wire leads 57 to expose a conductor for attachment to a terminal of the receptacle 45, which acts as a power source.

Providing the power supply 54 within the wall, in close proximity to and in direct connection with powered devices, such as VoIP phones, and reduces power loss, which may be up to 2 W per port, associated with providing power over standard network cables from a network switch with PoE or a midspan device.

The mounting plate 56 is preferably constructed of aluminum and acts not only as a member to which other components may be mounted, but also as a heat sink when thermally coupled to the power supply and as an EMI shield for the AC to DC and/or DC to DC circuitry in the power supply 54. Preferably, the mounting plate 56 defines a plurality of openings arranged in a spaced relationship corresponding to locations of fastener-receiving mounting ears 42 of a conventional multi-gang wall box 40. In this manner, screws may be used in a conventional manner to secure the mounting plate 56, and in essence the network outlet fixture 50, to the multi-gang wall box 40.

The network outlet fixture 50 further includes a circuit board 58 that includes commercially available network switching circuitry configured to switch electrical signals among network connectors and optionally PoE control circuitry to supply power to the data connectors. Any suitable network switching circuitry may be employed, such as conventional Ethernet switching circuitry providing 10/100 or gigabit Ethernet switched port functionality, and more preferably Power over Ethernet switched port functionality. The circuit board 58 is supported on the mounting plate 56 opposite the power supply 54, e.g. on the front side 56b of the mounting plate 56. A plurality of external electrical connectors 60, such as RJ45 jacks for terminating CAT5 or other electrical media, are supported on the circuit board 58 and are operably connected to the network switching circuitry, and optionally the power supply 54. These external electrical connectors 60 are exposed after in-wall mounting of the network outlet fixture 50, and are available for use to connect network devices within the user station.

The power supply 54 is operably connected to the circuit board 58 to supply power to the components of the network outlet fixture 50, such as the network switch circuitry. The power supply 54 is positioned to fit within the multi-gang wall box 40 when the mounting plate 56 is mounted to the wall box 40, as best shown in FIG. 4.

Preferably, the circuit board 58 is releasably mounted to the mounting plate 56 or the faceplate 70, e.g. by screw, snap, interference or other fasteners, such that it may be removed from the mounting plate 56 or face plate 70. Accordingly, the exemplary network outlet fixture 50 is constructed according to a multi-component design in which the circuit board 58 and the power supply 54 are each separate, removable components. This exemplary construction allows for upgrading of the network outlet fixture 50 by replacing only the power supply or only the circuit board, e.g. to add a fiber-to-copper media converter functionality to an existing network outlet fixture by replacing a circuit board lacking such circuitry with another circuit board including such circuitry, or to add gigabit Ethernet functionality to an existing network outlet fixture by replacing a circuit board having 10/100 Ethernet switching circuitry with a similar circuit board having 1 or 10 gigabit Ethernet switching circuitry, or to replace or upgrade a power supply by removing one and mounting another, etc.

In certain embodiments, the network outlet fixture 50 is configured for attachment to in-wall cabling that is of an electrical media type, such as CAT 5, CAT5e or CAT 6. In such an embodiment, the circuit board 58 includes a suitable electrical connector (such as an RJ45 jack) for terminating the in-wall cable 62 leading to the wall box 40.

In certain other embodiments, the network outlet fixture 50 is configured for use in fiber-to-the-wall applications, in which the in-wall cable 62 is of an optical media type, such as an optical fiber. In such embodiments, the network outlet fixture 50 further provides fiber-to-copper media converter functionality, and thus includes a fiber-to-copper converter including conventional media converter circuitry for creating an electrical signal to be carried by the circuit board 56 from an optical signal carried by optical fiber, etc. entering the wall box 40 and housing 52. As will be appreciated by those skilled in the art, the term "copper" is used to broadly encompass media of various materials that are used to transmit electrical signals, and is not limited to copper materials in a literal sense. Conventional commercially available components, such as a small form factor (SFF) transceiver operably mounted on the circuit board for converting optical signals to electrical signals, and vice versa, may be used for this purpose. The fiber-to-copper media converter further includes a fiber optic connector of a type suitable for terminating fiber optic media, such as suitable LC connector for terminating optical media. Optionally, the suitable connector is mounted directly on the circuit board.

Accordingly, the network outlet fixture 50 includes bi-directional switching circuitry for receiving electrical signals, from either copper in-wall cabling or from a transceiver converting optical signals from optical in-wall cabling to electrical signals, and switching them among the plurality of external electrical connectors 60, and for transmitting electrical signals received via the external electrical connectors 60 to either copper or optical (via the transceiver) in-wall cabling. Accordingly, the exemplary network outlet fixture provides both network switching and media conversion functionality between network hardware, etc. and network devices, such as a desktop or laptop computer, network printer, VoIP telephone, etc. within a user station.

In a certain embodiment, the network outlet fixture 50 includes structures allowing for an electrical disconnection from the power source upon removal of a face plate 70 of the fixture. The face plate 70 is configured to be mounted in a position in which the face plate covers a room-facing side (opposite the wall side) of the circuit board 58.

Preferably, the face plate 70 includes a structure that makes or breaks contact in a manner closing the circuit to electrically connect the fixture 50 to the receptacle 45/power source. Any suitable mechanisms and circuitry may be included to provide that the power supply is disconnected from the network outlet circuitry when the face plate 70 is removed.

In one embodiment, the face plate 70 contains a push member 72 that extends from the face plate 70 through an opening 59 in the mounting plate 56 to an electrical switch 55 of the power supply 54. The push member 72 has a length such that when the face plate 70 is properly mounted, the end of the push member 72 pushes on and actuates the electrical switch 55. This closes the circuit and causes supply of power to the circuit board 58. When the face plate 70 is removed, the push member 70 disengages the electrical switch 55, opening the circuit, and causing interruption of the power supply to the circuit board 58. Any suitable configuration may be used to cause supply and interruption of power as the result of mounting and removal of the face plate 70, respectively. Exemplary alternative configurations may include optical or magnetic sensors configured to sense the presence and/or removal of the face plate 70.

Optionally, the face plate 70 is configured to trim not only the network outlet fixture 50, but also an adjacent receptacle mounted within the same multi-gang wall box 40, as best shown in FIGS. 2, 5 and 6. The face plate 70 may be mounted in a variety of manners. By way of example, openings 72, 74 in the face plate 70 aligned with apertures of the receptacle 45 and/or mounting plate 58 may be provided for screw-mounting in a manner conventional for face plates for receptacles, light switches, and the like, as best shown in FIG. 2. Optionally, the face plate 70 may be configured to be secured by screw(s) to the receptacle only, and to overhang or "float" over the adjacent network outlet fixture. Alternatively, the face plate 70 may be secured to the mounting plate 56 by means of a hinge connection located along an edge of the face plate 70, e.g. the edge furthest from the receptacle.

Certain preferred embodiments include structures allowing for mounting of the external electrical connectors 60, i.e. mounting of the circuit board 58 on which the external electrical connectors 60 are fixedly mounted, in any selected one of a plurality of different rotational orientations (e.g., 0 degrees, 180 degrees) relative to a remainder of the outlet fixture (e.g., mounting plate 56) to allow for presentation of the external electrical connectors in a single preferred orientation (e.g., facing downwardly as in FIG. 6) while permitting the remainder of the network outlet fixture 50 to be mounted in any one of a plurality of different orientations relative to a wall, and with the receptacle to the left or to the right within the wall box. The circuit board 58 and the mounting plate 56 are preferably provided with complementary structures for this purpose.

More specifically, in the exemplary embodiment of FIGS. 3-6, it is preferred to mount the circuit board 58 in a preferred orientation in which the external electrical connectors 60 are positioned adjacent a bottom edge of the network outlet fixture 50 and to the right of the receptacle, as shown in FIGS. 4 and 6. Further, the circuit board 58 and face plate 70 are configured so that they may be mounted in either of a 0 degree position (right side up and to the right of the receptacle) as shown in FIGS. 4 and 6, or in a 180 degree position (upside down and to the left of the receptacle) relative to the mounting plate 56. Accordingly, if the mounting plate 56 is mounted to the wall box 40 in a position that is inverted relative to the position in which it is shown in FIGS. 4 and 6, the circuit board 58 and face plate 70 may be mounted in the 180 degree position relative to the mounting plate so that the external electrical connectors 60 are again positioned adjacent the bottom edge of the network outlet fixture 50, as best shown in FIGS. 7A and 7B. Accordingly, the external electrical connectors 60 may be presented on the wall in the preferred orientation even when the mounting plate and/or a remainder of the fixture is mounted relative to the wall in any one of several different orientations.

Referring again to FIGS. 7A and 7B, the circuit board 58 preferably includes an array 64 of LEDs 66a, 66b, 66c, 66d, 66e, etc. operatively connected to the network switch circuitry to selectively illuminate to confirm power to the wall-mounted network switch, a status of a transmission link associated with a respective network connector, a status of data transmission via a transmission link associated with a respective network connector, etc. as generally known in the art. In accordance with the present invention, the array 64 is provided on the circuit board in a position that is rotationally symmetrical (e.g., about a centerpoint C) to a position of the external electrical connectors 60. Further, as best shown in FIGS. 5 and 6, the face plate 70 includes symmetrically positioned openings 72a, 72b, such that each opening is capable of interchangeably receiving either the array 64 of LEDs (and optionally a translucent trim plate) or the electrical connectors 60. Accordingly, just as the external electrical connectors 60 may be maintained in the preferred (downward-facing) orientation in any one of several different orientations, the array 64 of LEDs similarly may be maintained in a preferred (upward-facing) orientation, regardless of the orientation of the mounting plate relative to a receptacle.

The mounting plate 56 is provided with a plurality of symmetrically positioned mounting bosses to which the circuit board 58 and/or face plate 70 are mounted by screws or other mechanical fasteners 80, or by a snap/interference fit of their respective structures. The circuit board 58 in FIG. 7 includes mounting holes 59 that are symmetrically located relative to horizontal and vertical planes passing through the center of the circuit board, and are aligned over threaded standoffs attached to the mounting plate 56. Threaded fasteners are used to attach the circuit board 58 to the mounting plate 56. When the mounting plate 56 is moved from the upright position to the right of the receptacle, as shown in FIG. 7A, to the upside down position to the left of the receptacle, as shown in FIG. 7B, the symmetry of the mounting holes 59 allows the circuit board 58 to be attached to the mounting plate 56 with the output connectors 60 facing downward in both mounting plate orientations. Optionally, the circuit board 58 may be attached to the face plate 70 with similar symmetrical fastening features.

In an alternative symmetrical embodiment, the circuit board 58 and mounting plate 56 need not be configured to permit mounting of the circuit board 58 to the mounting plate 56 in either of an upright or an inverted position. Instead, the mounting plate 56 may be configured to receive the circuit board 58 in only a single orientation. However, the array 64 of LEDs and the connectors 60 are nevertheless symmetrically arranged on the circuit board 58 relative to the receptacle 45. Accordingly, the face plate 70 may be mounted in either an upright (0 degree) or an inverted (180 degree) orientation, and the array 64 and external electrical connectors 60 will be received in the openings 72a, 72b in both orientations. Additionally, the connectors 60 are maintained in the preferred (downward-facing) orientation and the array 64 of LEDs similarly is maintained in the preferred (upward-facing) orientation, regardless of the position of the mounting plate relative to a receptacle, and while the mounting plate and circuit board are maintained in an upright position relative to the wall.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A network outlet fixture comprising: a mounting plate defining a plurality of openings arranged in a spaced relationship corresponding to locations of fastener-receiving mounting ears of a conventional multi-gang wall box, said multi-gang wall box defining a cavity, said mounting plate having a front surface and a rear surface; a circuit board supported on said front surface of said mounting plate, said circuit board comprising a plurality of external network connectors and network switching circuitry configured to switch electrical signals among said plurality of external network connectors; an AC/DC power supply comprising an AC to DC power converter component, said power supply being operably connected to said circuit board for powering said network switching circuitry, said power supply being supported in position to be physically positioned within said cavity of said multi-gang wall box when said mounting plate is mounted by fasteners to said fastener receiving mounting ears of said multi-gang wall box; a face plate configured to be mounted in a position in which said face plate covers a room-facing side of said circuit board; and a switch configured to selectively disconnect said power supply from a power source.

2. The network outlet fixture of claim 1, wherein said power supply is releasably mounted to said mounting plate.

3. The network outlet fixture of claim 2, wherein said power supply comprises a plurality of insulated wire leads, each of said plurality of insulated wire leads having a distal portion at which a conductor is exposed for direct connection to a terminal of a power source.

4. The network outlet fixture of claim 1, wherein said circuit board is releasably mounted to said mounting plate.

5. The network outlet fixture of claim 1, said circuit board further comprising an optical connector and media converter circuitry configured to convert optical signals to electrical signals and electrical signals to optical signals, said power supply being operably connected to said circuit board for powering said media converter circuitry.

6. The network outlet fixture of claim 1, further comprising:
a housing supported on said rear surface of said mounting plate to enclose said power supply, said housing being positioned and dimensioned to be physically positioned within said cavity of said multi-gang wall box when said mounting plate is mounted to said multi-gang wall box.

7. The network outlet fixture of claim 1, wherein said power supply is supported on said rear surface of said mounting plate.

8. The network outlet fixture of claim 7, wherein said face plate is further configured to trim an adjacent AC power receptacle mounted within said multi-gang wall box.

9. The network outlet fixture of claim 8, wherein said face plate defines an opening aligned with a screw-receiving opening of said AC power receptacle.

10. The network outlet fixture of claim 1, wherein said face plate further comprises a push member positioned to engage said switch when said face plate is mounted to said wall box, and to disengage said switch and disconnect said power supply from said power source when said face plate is demounted from said wall box.

11. The network outlet fixture of claim 1, wherein said circuit board and said mounting plate comprise complementary structures allowing for mounting of said circuit board to said mounting plate in any selected one of a plurality of distinct rotational orientations.

12. A network outlet fixture comprising: a mounting plate defining a plurality of openings arranged in a spaced relationship corresponding to locations of fastener-receiving mounting ears of a conventional multi-gang wall box, said mounting plate having a front surface and a rear surface; a circuit board supported on said front surface of said mounting plate, said circuit board comprising a plurality of external network connectors and at least one of network switching circuitry and media converter circuitry, said network switching circuitry being configured to switch electrical signals among said plurality of external network connectors, said media converter circuitry being configured to convert optical signals to electrical signals and electrical signals to optical signals; a power supply operably connected to said circuit board for powering said network switching and media converter circuitry, said power supply being in position to be physically positioned within said multi-gang wall box when said mounting plate is mounted to said multi-gang wall box; a face plate configured to be mounted in a position in which the face plate covers a room-facing side of said circuit board; and a switch configured to selectively disconnect said power supply from a power source when said face plate is absent from said position; wherein said circuit board and said mounting plate comprise complementary structures allowing for mounting of said circuit board to said mounting plate in any selected one of a plurality of distinct rotational orientations.

13. The network outlet fixture of claim 12, wherein said power supply being is supported on said rear surface of said mounting plate.

14. The network outlet fixture of claim 12, wherein said face plate comprises a push member positioned to engage said switch when said face plate is present in said position, and to disengage said switch and disconnect said power supply from said power source when said face plate is absent from said position.

15. The network outlet fixture of claim 12, further comprising an array of light emitting diodes (LEDs) mounted on said circuit board and operably connected to said network switching circuitry, said array of LEDs and said plurality of external network connectors being mounted on said circuit board in respective locations that are positioned with rotational symmetry relative to one another, said rotational symmetry permitting mounting of a face plate adjacent to said circuit board in any selected one of a plurality of distinct rotational orientations in which each of said array of LEDs and said plurality of external network connectors registers with a respective opening defined in said face plate.

16. A network outlet fixture comprising:
a mounting plate having a front surface and a rear surface;
a circuit board supported on said front surface of said mounting plate, said circuit board comprising a plurality of external network connectors and at least one of network switching circuitry and media converter circuitry, said network switching circuitry being configured to switch electrical signals among said plurality of external network connectors, said media converter circuitry being configured to convert optical signals to electrical signals and electrical signals to optical signals;

a face plate configured to be mounted in a position in which said face plate covers a room-facing side of said circuit board; and a switch configured to selectively disconnect said circuit board from a power source when said face plate is absent from said position.

17. The network outlet fixture of claim 16, wherein said circuit board and said mounting plate comprise complementary structures allowing for mounting of said circuit board to said mounting plate in any selected one of a plurality of distinct rotational orientations.

18. The network outlet fixture of claim 17, further comprising:

a power supply supported on said mounting plate, said power supply being operably connected to said circuit board, said power supply being positioned on said mounting plate to be physically positioned within said multi-gang wall box when said mounting plate is mounted to said multi-gang wall box, said power supply comprising a plurality of insulated wire leads, each of said plurality of insulated wire leads for direct connection to a power source.

19. The network outlet fixture of claim 17, wherein said power supply and said circuit board are releasably mounted to said mounting plate.

* * * * *